(12) United States Patent
Wilson et al.

(10) Patent No.: US 10,198,377 B2
(45) Date of Patent: Feb. 5, 2019

(54) VIRTUAL MACHINE STATE REPLICATION USING DMA WRITE RECORDS

(71) Applicant: Amazon Technologies, Inc., Seattle, WA (US)

(72) Inventors: Matthew Shawn Wilson, Seattle, WA (US); Anthony Nicholas Liguori, Bainbridge Island, WA (US); Shuvabrata Ganguly, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 145 days.

(21) Appl. No.: 15/173,445

(22) Filed: Jun. 3, 2016

(65) Prior Publication Data

US 2016/0283421 A1 Sep. 29, 2016

Related U.S. Application Data

(62) Division of application No. 14/317,949, filed on Jun. 27, 2014, now Pat. No. 9,361,145.

(51) Int. Cl.
| | |
|---|---|
| *G06F 13/28* | (2006.01) |
| *G06F 12/00* | (2006.01) |
| *G06F 9/455* | (2018.01) |
| *G06F 9/48* | (2006.01) |

(52) U.S. Cl.
CPC .......... *G06F 13/28* (2013.01); *G06F 9/45558* (2013.01); *G06F 9/4881* (2013.01); *G06F 2009/4557* (2013.01); *G06F 2009/45562* (2013.01)

(58) Field of Classification Search
CPC .................................. G06F 13/28; G06F 12/00
See application file for complete search history.

(56) References Cited

U.S. PATENT DOCUMENTS

| | | | |
|---|---|---|---|
| 7,761,573 B2 | 7/2010 | Travostino et al. |
| 8,281,013 B2 | 10/2012 | Mundkur et al. |
| 8,370,560 B2 | 2/2013 | Dow et al. |
| 8,635,396 B2 | 1/2014 | Dow et al. |
| 8,689,211 B2 | 4/2014 | Agbaria et al. |
| 8,924,624 B2 | 12/2014 | Miyoshi |

(Continued)

FOREIGN PATENT DOCUMENTS

WO 2014032233 3/2014

OTHER PUBLICATIONS

U.S. Appl. No. 14/864,682, filed Sep. 24, 2015, Mikhail Danilov, et al.

(Continued)

*Primary Examiner* — David E Martinez
(74) *Attorney, Agent, or Firm* — Robert C. Kowert; Meyertons, Hood, Kivlin, Kowert & Goetzel, P.C.

(57) ABSTRACT

A DMA-capable device of a virtualization host stores a DMA write record, indicating a portion of host memory that is targeted by a DMA write operation, in a write buffer accessible from a virtualization management component of the host. The virtualization management component uses the DMA write record to identify a portion of memory to be copied to a target location to save a representation of a state of a particular virtual machine instantiated at the host.

20 Claims, 9 Drawing Sheets

(56) References Cited

U.S. PATENT DOCUMENTS

| | | |
|---|---|---|
| 2002/0194401 A1* | 12/2002 | Sakugawa ............... G06F 13/30 710/28 |
| 2010/0071025 A1 | 3/2010 | Devine et al. |
| 2010/0299666 A1 | 11/2010 | Agbaria et al. |
| 2010/0332657 A1 | 12/2010 | Elyashev et al. |
| 2011/0066597 A1 | 3/2011 | Mashtizadeh et al. |
| 2011/0131568 A1 | 6/2011 | Heim |
| 2011/0179415 A1 | 7/2011 | Donnellan et al. |
| 2012/0179855 A1 | 7/2012 | Tsirkin et al. |
| 2012/0221710 A1 | 8/2012 | Tsirkin |
| 2012/0311568 A1 | 12/2012 | Jansen |
| 2013/0054813 A1 | 2/2013 | Bercovici et al. |
| 2013/0254321 A1 | 9/2013 | Johnsen et al. |
| 2013/0254368 A1 | 9/2013 | Guay et al. |
| 2014/0115175 A1 | 4/2014 | Lublin et al. |

OTHER PUBLICATIONS

Amazon Web Services, "Amazon Virtual Private Cloud User Guide", API Version, Apr. 15, 2015, pp. 1-206.

U.S. Appl. No. 14/658,965, filed on Mar. 16, 2015, Weili Zhong McClenahan.

"Live Migration of Virtual Machines", Christopher Clark, et al., 2nd Symposium on Networked Systems Design & Implementation, 2005, pp. 273-286.

"CompSC: Live Migration with Pass-through Devices", Zhenhao Pan, et al., Mar. 2012, pp. 109-120.

* cited by examiner

Consolidated record buffer 601
(contains DMA write records for
>1 guest VM)

605A
(for VM1)

605B
(for VM2)

605C
(for VM3)

605D
(for VM4)

VM-specific record queues 605

VIRTUAL MACHINE STATE REPLICATION USING DMA WRITE RECORDS

This application is a divisional of U.S. patent application Ser. No. 14/317,949, filed Jun. 27, 2014, now U.S. Pat. No. 9,361,145, which is hereby incorporated by reference herein in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization host to be shared among multiple users by providing each user with one or more virtual machines hosted by the single virtualization host. Each such virtual machine may represent a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems.

For several reasons including load balancing, scheduled hardware/software maintenance operations and the like, techniques for live migration of virtual machines from one virtualization host to another may be implemented in some environments. During live migration, the state of various resources (e.g., physical memory, networking devices and the like) being used by a virtual machine at the source virtualization host may have to be replicated at a destination virtualization host while minimizing interruptions to the applications being run on the virtual machine. Virtualization management software (e.g., a hypervisor) running on the source virtualization host may be able to keep track of some kinds of state changes (e.g., writes to physical memory that are implemented via the hypervisor) fairly easily. However, keeping track of other kinds of state changes that have to be replicated, such as writes to physical memory by hardware devices that are DMA (direct memory access) capable, and can therefore bypass the virtualization management software when writing to physical memory, may be more problematic.

Figure 1:
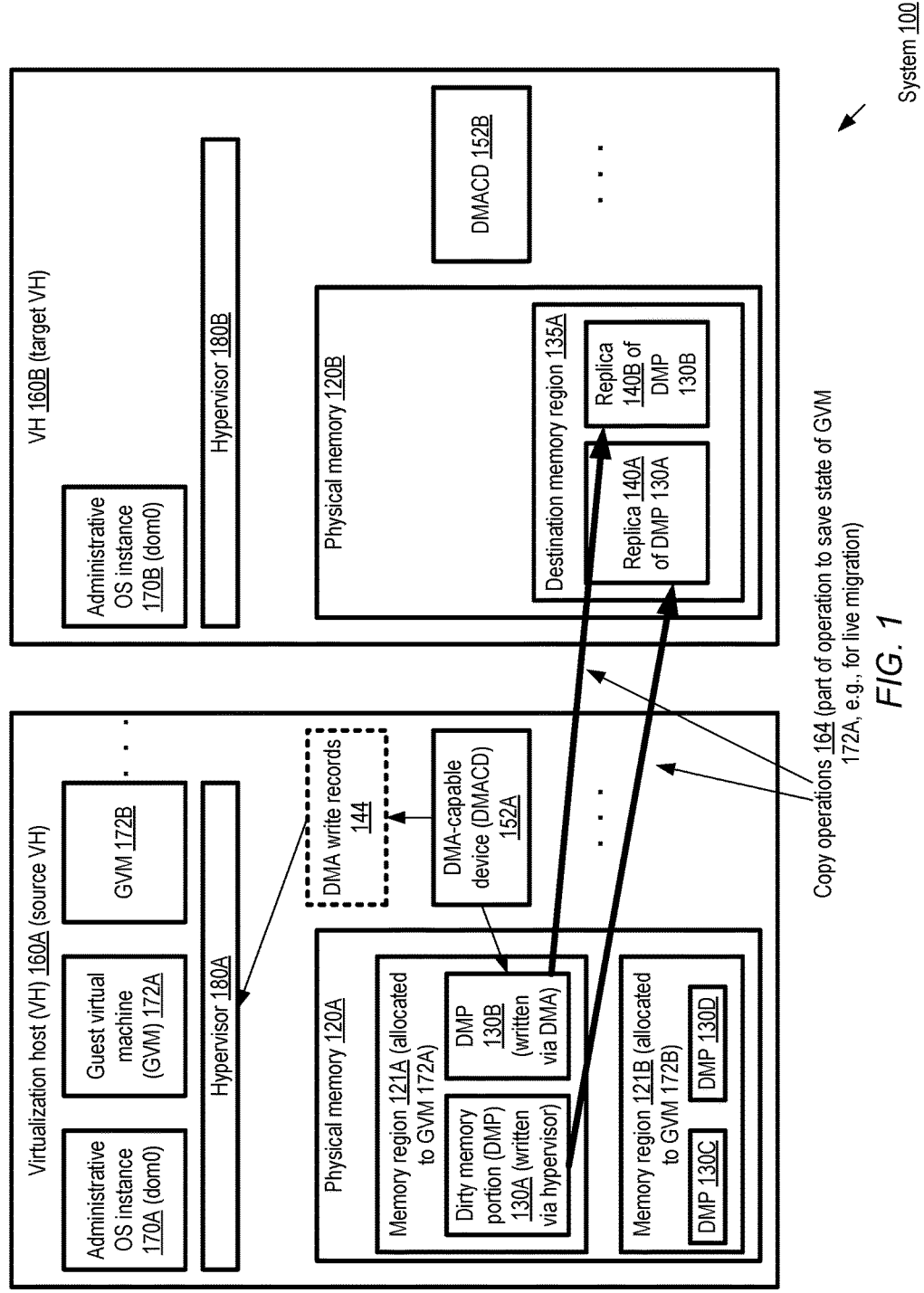
FIG. 1 illustrates an example system environment in which, during an operation to save a state of a virtual machine, a virtualization management component (VMC) uses DMA write records stored by a DMA-capable device to identify regions of memory that have been written to by the DMA-capable device, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for using DMA write records during operations to save virtual machine (VM) state information are described. State information of a virtual machine running on a computer server (which may be termed a virtualization host herein) may be replicated for a variety of reasons, e.g., in a provider network or "public cloud" environment. For example, VM state may be replicated to support live migration of a compute instance of a virtual computing service of the provider network from one virtualization host to another for workload management purposes including load balancing and automated scaling in some embodiments. VM state may also or instead be saved to enable scheduled maintenance of hardware/software resources with minimal disruption to client applications running on the virtual machine, or to checkpoint the virtual machine state for possible future failovers in various embodiments. Networks set up by an entity such as a company or a public sector organization to provide one or more services (such as various types of multi-tenant and/or single-tenant cloud-based computing or storage services) accessible via the Internet and/or other networks to a distributed set of clients may be termed provider networks in this document. A given provider network may include numerous data centers hosting various resource pools, such as collections of physical and/or virtualized computer servers, storage devices, networking equipment and the like, needed to implement, configure and distribute the infrastructure and services offered by the provider. Within large provider networks, some data centers may be located in different cities, states or countries than others, and in some embodiments the resources allocated to a given application may be distributed among several such locations to achieve desired levels of availability, fault-resilience and performance. In at least some embodiments, the state of a VM executing on a virtualization host within a particular data center may be saved to a different virtualization host located at a different data center, e.g., in accordance with the availability and resiliency requirements of the client on whose behalf the VM is instantiated.

Virtualization management components of a virtualization host, such as a hypervisor and/or an administrative operating system instance running in a privileged domain, may typically be involved as intermediaries in various types of interactions between the virtual machines instantiated at the virtualization host and hardware components such as processors, physical memory (RAM), network cards, disks, other storage devices, and so on. Such virtualization management components may be referred to herein as VMCs. Respective portions of the physical memory of a given virtualization host may be assigned to different VMs running on the host by the VMCs in some embodiments. At least some of the write operations initiated from a given VM (e.g., by applications being executed by the client on whose behalf the VM is instantiated) may have to pass through the VMCs on their way to the physical memory.

In general, some amount of overhead may be incurred for write operations that are handled by the VMCs, as compared to the amount of processing that may have been required for performing similar write operations in a non-virtualized environment. To reduce such virtualization-related performance penalties, especially for network transfers and/or interactions with storage devices, for example, at least some virtualization environments may support DMA-capable hardware devices that can bypass the VMCs when performing writes to physical memory. Such write operations may also be referred to as pass-through operations, and the devices that initiate such operations may be referred to as pass-through devices. In some embodiments, the set of DMA-capable devices of a virtualization host may include a variety of hardware cards that attach to industry-standard communication interconnects such as a PCIe (Peripheral Interconnect Component Express) interconnect (or buses/interconnects complying with other variants of the PCI family of standards). Such hardware cards may be used in some embodiments to offload networking-related processing (e.g., at least some encapsulation and/or de-encapsulation functions of various networking protocols in use within the provider network may be performed at the cards), and/or to offload storage-related processing (e.g., for block-device I/O) from the processors of the virtualization host. In one embodiment, a DMA-capable device of a virtualization host may be compliant with the Single Root I/O Virtualization (SR-IOV) specification of the PCI Special Interest Group (PCI SIG). In at least one embodiment, the set of DMA-capable devices at a virtualization host may include one or more GPUs (graphics processing units), which may be utilized to perform certain types of computations requested by applications running on the VMs. The acronym DMACD may be used herein to refer to these and other types of DMA-capable devices supported at various virtualization hosts.

The VMCs of the virtualization host may be responsible for identifying the portions of physical memory that are used to store the state information of a VM (which may include operating system state information as well as end-user application state information), and/or for copying such portions to a target location as part of a state-saving operation in at least some embodiments. While the VMCs may be able to track the memory changes corresponding to non-DMA writes fairly easily (as such writes are performed by the VMCs themselves), writes performed by the DMACDs may be harder to track since they bypass the VMCs. Accordingly, in at least some embodiments, an interface may be established to allow the DMACDs to indicate to the VMCs the portions of host memory that the DMACDs have modified using DMA.

In at least one embodiment, one or more buffers or queues may be established in a location that can be accessed by a DMACD and by a VMC. At least during some selected stages of a state replication process for a given VM, a DMACD may generate records indicating the portions of the virtualization host's physical memory that are written by the DMACD, and the VMC may read the records to determine the memory contents that should be replicated to save VM state. In some embodiments, upon determining that an operation to save or replicate a state of a particular VM is to be performed (e.g., for a live migration, storing a checkpoint for a hot or warm standby virtualization host, storing a checkpoint at a storage device that currently is not attached to a virtualization host, hibernating the VM, or for some other reason), a VMC may direct one or more DMACDs of the virtualization host to start generating and storing DMA write records. A variety of approaches may be used to request or command the DMACD to start storing the write records in different implementations—e.g., an explicit command may be issued, a flag may be set in a register that is polled by the DMACD, or a flag may be set at the buffer or buffers to be used for the write records. Thus, in at least some embodiments, the extra work of generating and storing the DMA write records may only have to be performed during relatively infrequent time windows or periods corresponding to one or more phases of a state-saving operation; most of the time, the DMACD may not have to generate or store the records. In other embodiments, at least some DMACDs may store DMA write records by default—e.g., the VMC may not need to explicitly direct or command such DMACDs to store the DMA write records.

In one embodiment, a DMA write record corresponding to a given DMA write operation may comprise an indication of the starting physical memory address or offset to which the write is directed, and a size of the write (e.g., how may bytes are modified as a result of the write). In at least some embodiments, a DMA write record may also include an identifier of the particular VM to which the memory being written to is assigned. In the case of DMACDs that are connected to a PCIe interconnect or PCI bus, for example, the requester identifier (RID) associated with a DMA write performed via the interconnect or bus may serve as a virtual machine identifier, or as a proxy for a VM identifier. In order to save the memory state of a particular VM, the VMC may use the stored VM identifiers to select which dirty memory segments were assigned to that particular VM. In other embodiments, a second approach may be used, in which a respective record buffer may be set up for each VM running on the host, and the VMC may simply examine the contents of a particular one of the buffers to ascertain the dirty memory regions (resulting from DMA writes) that have to be copied to save the corresponding VM's state. In a third approach, the VMC may direct or command a DMACD to only save DMA write records for those DMA writes that are directed to memory assigned to one or more specified VMs (i.e., the ones whose state is to be saved). In at least some embodiments, the state of more than one VM running on a given virtualization may be saved in parallel. In one embodiment, a virtualization host may comprise multiple DMACDs, each of which may generate respective sets of DMA write records corresponding to their DMA write operations. In one implementation, each of the DMACDs may have a respective set of record buffers for storing DMA write records. In another implementation, at least one record buffer may be shared by multiple DMACDs.

After examining the relevant set of DMA write records stored by the DMACD in the buffer or buffers, in various embodiments the VMC may add the dirty memory regions indicated by the records to the list of regions to be replicated at a destination virtualization host as part of the state saving operation. The replication operation may then be initiated. In one implementation, for example, a hypervisor may be responsible for generating a list of memory pages or blocks to be copied, and the hypervisor may supply the list to a different virtualization management component such as an administrative operating system instance to initiate the actual transfer of the memory contents. In another implementation, the hypervisor may itself transfer the dirty memory contents. In some implementations, the administrative operating system rather than the hypervisor may read the record buffers to identify the dirty memory regions and transfer the contents of the dirty memory regions. It is noted that the term "replication", when used herein with reference to state information of a virtual machine, refers to copying the state information from a source location to a destination location, with no restrictions implied on whether or for how long the state information is retained at the source location after it has been copied. The destination location may, for example, comprise a volatile memory or a persistent storage device at a target virtualization host, or a storage device that is not currently attached to a target virtualization host. If the state information is replicated for a live migration, the source version of the state information may be discarded or lost after the migration is committed or completed (as discussed below in reference to FIG. 2). If the state information is replicated or check-pointed for a possible failover, the virtual machine whose state is saved may continue to operate, so the source version may not be discarded.

In at least some embodiments, a producer-consumer relationship may exist between a DMACD (which produces the DMA write records and stores them in a record buffer if space is available) and the VMC (which consumes the DMA write records from the buffer and thereby increases the buffer space available). In one embodiment, a VMC may provide a signal or an indication to the DMACD that it has examined or consumed the contents of a given write record, e.g., by setting a "read-completed" flag corresponding to the record. The signal may thus inform the DMACD that the buffer slot or space used for that record is available for re-use or overwriting by the DMACD. After using a particular slot of the buffer for a DMA write record in such embodiments, the DMACD may have to wait for the VMC's indication before that slot can be written to again.

Depending on the rates at which the VMC consumes write records and the DMACD stores the write records, under certain conditions a record buffer may become full, i.e., no free slots may be available in the buffer for at least some time interval. In embodiments in which the DMACD has to wait for a buffer slot to become available before it is permitted to perform another DMA write, the VMC may therefore be able to control the rate of DMA writes issued by the DMACD by altering the rate at which the buffer slots are freed. For example, during an iterative copy phase of a live migration procedure (described in further detail below), the VMC may have to copy both DMA-written portions of memory and non-DMA-written portions of memory, and both types of memory writes may be going on concurrently. If the VMC determines that the rate at which non-DMA writes are occurring (e.g., as a result of some subset of client application operations) is higher than a threshold level, such that the VMC is having difficulty replicating the corresponding modified portions of memory, the VMC may attempt to throttle or slow down the rate at which the DMACD-initiated writes can proceed. By slowing down the rate at which it examines write records and/or frees up record buffer space for the DMACD's write records, or by allowing the record buffer to remain completely filled for some time, the VMC may reduce the rate of the DMACD-initiated writes in some embodiments. The DMACD may defer (or in some cases abandon) additional DMA writes as long as no free buffer slot is available in such embodiments. The VMC may later resume freeing up buffer lots, e.g., when its backlog of non-DMA memory copy operations falls below a threshold level, thus allowing the DMACD to increase DMA write rates. In at least some implementations, the VMC may examine a DMA write record without immediately indicating to the DMACD that the corresponding buffer slot is available—e.g., the operations of reading a record and freeing up its buffer slot need not be synchronous with respect to each other.

As mentioned above, DMA write records may only be generated during specific phases of state-saving procedures in some embodiments. In at least one embodiment, after a targeted portion or all of the memory replication work of such a phase has been completed, the VMC may direct the DMACD to stop DMA operations and save a representation of the DMACD's own configuration state in a specified location. The DMACD's state information may then be copied to a destination virtualization host, where it may be used to bring another DMACD online if and when necessary. For example, for a live migration of a particular VM (VM1) from virtualization host VH1 to a destination virtualization host VH2, the state of a DMA-capable network processing offload card NPOC1 of VH1 may be replicated to VH2. This may enable VH2's DMA-capable network processing offload card NPOC2 to be brought online in such a way that applications that were running within VM1 at VH1 can continue without significant networking-related negative side effects after VM1 is migrated to VH2. In at least some embodiments, after a state of a particular VM has been saved at a destination host, the VMC may indicate to the DMACD that it is no longer required to generate and store DMA write records.

In some embodiments, a portion of the local memory of a DMACD may be used for the record buffer or buffers into which the DMACD is to store its write records. In other embodiments, a portion of the virtualization host's physical memory may be used, and the write records may also be written to the buffer using DMA. In some implementations, the record buffer or buffers may be implemented as queues (e.g., first-in-first-out queues). In one embodiment, DMACD firmware may be programmed to execute the DMA record generation logic described above. In another embodiment, an ASIC (application-specific integrated circuit) designed to implement the DMA record generation logic may be used at a DMACD. The interface or interfaces to be used for the interactions between DMACDs and VMCs may be defined in a published standard in some embodiments, enabling DMACD vendors to certify that their devices can be used for the kinds of state-saving operations described herein.

In one embodiment, a somewhat different approach may be taken to enable a VMC to identify portions of memory that have been modified by a DMACD. Instead of using a record buffer written to by the DMACD and read by the VMC, an I/O MMU (input/output memory management unit) that acts as an intermediary between the DMACD and main memory may be used. The I/O MMU may maintain a data structure (such as a bitmap or table), e.g., within the physical memory of the virtualization host, indicating the portions of main memory that have been written to by a DMACD, and the VMC may be able to access the data structure to identify the DMA-modified portions of memory that are to be replicated.

Example System Environment

FIG. 1 illustrates an example system environment in which, during an operation to save a state of a virtual machine, a virtualization management component (VMC) uses DMA write records stored by a DMA-capable device to identify regions of memory that have been written to by the DMA-capable device, according to at least some embodiments. As shown, system 100 includes a source virtualization host (VH) 160A, and a destination virtualization host 160B. At source virtualization host 160A, one or more guest virtual machines (GVMs) may be instantiated with the help of virtualization management software components (VMCs) such as hypervisor 180A and an administrative operating system instance 170A. A virtual machine running in a privileged domain (which may be referred to as "dom0" in some implementations) may be used for the administrative operating system instance in the depicted embodiment, in contrast to non-privileged or user domains (respective "domU"s) that may be used for the guest virtual machines. Two guest VMs 172A and 172B are shown at virtualization host 160A by way of example. In at least some embodiments, each guest VM 172 may be used for a respective compute instance assigned to a customer of a virtual computing service implemented at a provider network. If source virtualization host 160A is used in a multi-tenant mode, a given client whose compute instance is running at VH 160A may not necessarily be aware than any other instance assigned to any other client is also running at VH 160A. Thus, the virtualization management components may attempt to provide a respective level of service to each compute instance instantiated at VH1 that is ideally unaffected by the presence of the other compute instances.

Virtualization host 160A may comprise a number of different hardware components, of which a subset is illustrated in FIG. 1. In particular, virtualization host 160A may include a physical memory 120A (typically but not necessarily comprising some collection of random access memory or RAM modules) and one or more DMA-capable devices (DMACDs) such as DMACD 152A. The DMACDs may be employed, for example, in an effort to reduce virtualization-related performance overhead, especially for network and storage I/O operations. A DMACD, such as a network card attached to a PCIe interconnect of virtualization host 160A, may write directly into physical memory 120A without using a VMC as an intermediary. Other important hardware components such as processors, processor caches, disks, as well as the buses or interconnects between various hardware components are not shown in FIG. 1 to avoid clutter. Different portions of the physical memory 120A may be assigned or allocated to each of the guest virtual machines at a given point in time. For example, memory region 121A is shown assigned to guest VM 172A, while memory region 121B is shown assigned to guest VM 172B.

A determination may be made that the state of one or more guest VMs of VH 160A is to be saved to, or replicated at, destination virtualization host 160B in the depicted embodiment. A number of different triggers could lead such a determination in various embodiments. For example, the virtual computing service being implemented using the virtualization hosts may determine that resource utilization levels (e.g., CPU utilization, memory utilization, and so on) at virtual host 160A are high relative to the corresponding resource utilization levels at instance host 160B, and may therefore initiate a live migration procedure to achieve a more equitable balance of workloads. In another scenario, the application workload being handled using a given VM such as 172A may have grown over time, or may show signs of growing beyond the capabilities of host 160A. Host 160B may be more performant than host 160A, or may have more unused resource capacity than is available on host 160A, and may thus be identified as a good candidate destination for live migration of VM 172A. In some cases, host 160B may be configured as a standby for host 160A (at least with respect to some subset of host 160A's VMs), and the virtualization management service may decide that a point-in-time snapshot of VM 172A's state should be saved at host 160A, so that a replacement instance can quickly be started up at host 160B if a failover condition (such as a failure of host 160A or a sustained loss of connectivity to host 160A) is encountered. In some embodiments, alert messages (such as messages indicating cooling system failures, processor failures, or memory corruption) emanating from host 160A may be detected, indicating that one or more hardware or software components of host 160A have a high probability of failure within some time interval, and such alerts may trigger the saving of the state of VM 172A and/or 172B. In some embodiments, software and/or hardware upgrades may be required at host 160A, and a live migration of its VMs may be scheduled to accommodate the upgrades. In at least some embodiments, the virtual computing service may be designed to save the state of one or more VMs of host 160A with minimal impact on the applications running on the VMs, and often without necessarily notifying the clients on whose behalf the VMs are being run.

In order to replicate a representation of the state of a particular VM such as 172A, the VMCs (e.g., hypervisor 180A and/or administrative OS instance 170A) may have to identify the portions of memory assigned to the particular VM at which state information may be stored. For example, at the point in time illustrated in FIG. 1, memory region 121A may comprise at least two types of dirty (i.e., modified) memory portions that have to be replicated to destination memory region 135A at destination VH 160B. One dirty memory portion, DMP 130A, may have been written from VM 160A without using DMA operations, e.g., via interactions with the hypervisor 180A. As it is itself involved in such writes, the hypervisor 180A may easily be able to keep track of this first type of writes, and use its knowledge of such writes to initiate the copying of DMP 130A and other similar non-DMA write targets to destination VH 160B. As indicated by arrows 164, for example, replica 140A of DMP 130A may be created in destination memory region 135A of physical memory 120B of host 160B.

In contrast, DMP 130B may have been written using DMA operations by DMACD 152A, bypassing the hypervisor and/or the dom0 operating system instance. To enable the VMCs to identify DMP 130B as a portion of memory to be replicated to save VM 172's state, a VMC may direct the DMACD 152A to store a write record corresponding to each DMA write performed during at least a selected time interval (or a particular phase of a live migration procedure) in the depicted embodiment. In other embodiments, the DMACDs may store such write records even without being directed to do so, e.g., by default. The DMA write records may have to be stored in a shared location at which the VMCs can access them. As described below in further detail, the write records 144 may be stored in different types of locations in different embodiments, such as within VH 160A's physical memory 120A or within local memory of the DMACD that is accessible by the VMCs. For a given DMA write operation, in some embodiments the DMACD may first have to store a write record that indicates the location (e.g., the start address) and the size (e.g., the number of bytes or pages of memory being modified) of the write. In some implementations a write record may also include an identifier of the VM whose memory is being modified. For example, for a DMA write corresponding to DMP 130B, DMACD 152B may include VM 172A's identifier (e.g., a requester identifier in accordance with a PCI protocol) in the write record. For a DMA write corresponding to DMPs 130C or 130D (within memory region 121B assigned to guest VM 172B), an identifier of VM 172B may be included in the write record. In some implementations, as described below, separate record buffers may be implemented for DMA write records associated with each VM, while in other implementations, a single record buffer may be used to store DMA write records associated with several VMs.

In the example shown in FIG. 1, the hypervisor 180A may examine the write records 144 stored by the DMACD 152A, and add the memory indicated in the write records to its list of memory segments to be copied to host 160B to save VM 172A's state. The hypervisor may initiate a copy operation 164, e.g., by providing the list to the administrative operating system 170A, in the depicted embodiment. In other embodiments, the hypervisor 180A may itself perform the copy operation. In one embodiment, the administrative operating system 170A may examine the DMA write records and initiate the replication of the DMA-modified portions of the VM's memory to the destination VH 160B.

In the depicted embodiment, the DMACD 152A may have to store a DMA write record before it performs the corresponding DMA write operation. If insufficient free space is available within the buffer or queue allocated for the DMA write records, the DMACD may have to wait until free space becomes available before it can perform its next DMA write. The hypervisor 180A may be responsible in some embodiments for indicating to the DMACD (e.g., by setting a flag) that a particular buffer slot or queue entry is available for re-use or overwriting by the DMACD. By slowing the rate at which it consumes write records, the hypervisor may be able to limit the rate at which the DMACD 152B can perform DMA writes. Such a flow control mechanism may be employed by the hypervisor 180A, for example, if the other workload (such as the copying of DMP 130A or other memory regions written to without using DMA) for which the hypervisor 180A or the dom0 instance 170A is responsible exceeds some threshold level.

In at least some embodiments, after various dirty memory portions such as 130A and 130B have been copied to the destination VH 160B, at some stage a VMC such as hypervisor 180A may direct the DMACD 152A to stop DMA activity and save a representation of its (i.e., DMACD 152A's) own state at some location accessible from the VMC. The VMC may then initiate a transfer of DMACD 152A's state representation to destination host 160B, at which, for example, DMACD 152B may be activated as and when necessary to replicate the functionality that was earlier implemented by DMACD 152A at host 160A. When DMACD 152B is brought online, it may use the state information of DMACD 152A to resume the operations that were being performed by DMACD 152A when the latter's state was replicated.

In at least some embodiments, DMACDs 152A and 152B may comprise cards attached to PCIe or other similar interconnects at respective hosts 160A and 160B. In some embodiments in which a DMACD complies with the SR-IOV standard, DMA write records may be used in a manner similar to that described above to save the state of SR-IOV virtual functions. DMACDs 152 may perform network processing offloading functions, and/or storage-related processing offloading functions in various embodiments. In some embodiments, one or more of the DMACDs may comprise GPUs.

Live Migration Overview

Figure 2:
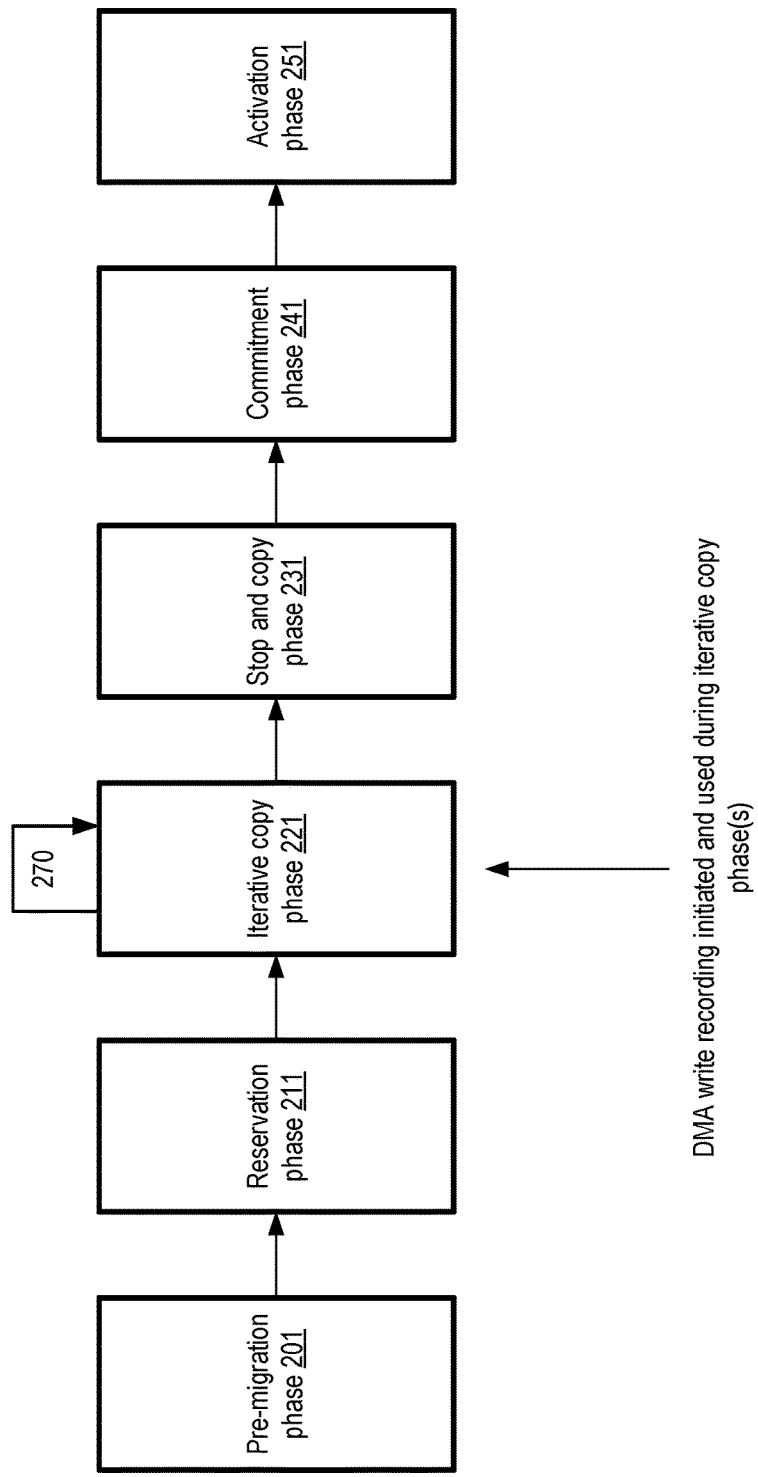
FIG. 2 illustrates an example sequence of phases of a live migration procedure that may include the identification of dirty memory regions written by DMA-capable devices during at least one phase, according to at least some embodiments.

As mentioned above, DMA write records generated by DMACDs 152 may be used to support live migration capabilities for virtual machines. FIG. 2 illustrates an example sequence of phases of a live migration procedure that may include the identification of dirty memory regions written by DMA-capable devices during at least one of the phases, according to at least some embodiments. As shown, a live migration of a virtual machine 172 from a source virtualization host 160A to a destination virtualization host 160B may comprise a pre-migration phase 201, a reservation phase 211, an iterative copy phase 221, a stop-and-copy phase 231, a commitment phase 241, and an activation phase 251 in the depicted embodiment.

During the pre-migration phase 201, the VM 172 may be active on the source virtualization host 160A. In some implementations, one or more candidate destination virtualization hosts that can accommodate the VM may be identified during normal operations of pre-migration phase 201. In some embodiments, a set of candidate migration destination hosts may be identified whenever a given instance host is brought online by the virtualization service of the provider network, e.g., to minimize the effort required to select target virtualization hosts if and when VM migration is required urgently. In other embodiments, candidate migration target hosts may be identified on a per-VM basis, e.g., when a new VM is launched, the metadata maintained for that VM by the virtualization service may include a list of candidate migration hosts. In some embodiments, such proactive identification of target hosts may not be performed.

During reservation phase 211, a specific destination host 160B may be identified for migrating the VM, and a VM container or slot at that host may be reserved. The specific destination host may be selected based on a variety of criteria in different embodiments, such as the current level of resource utilization at the host or the current number of VMs running on the host. In some embodiments, the availability requirements of applications running on to-be-migrated VM may be taken into account when selecting the destinations—e.g., an application may require that each of its instances be executed at a different data center, which may constrain the set of possible destination hosts that can be selected. If a reservation request directed to a given destination host fails, a different destination may be tried. If no destination can be reserved, the migration may be deferred or aborted in some embodiments.

During a first step of the iterative pre-copy phase 221, a set of selected dirty memory portions or pages containing state information of the to-be-migrated VM may be copied to the destination VH while the source VM remains active. For example, all the DMPs that a hypervisor has identified at a point in time T1 may be copied over (including, for example, specific portions of memory to which DMA write operations are permitted). However, during this first step, some new portions of memory may be written to, since the source VM remains running during phase 221. Thus, at least in some cases, a second iteration of copying may be required, which includes copying a second set of memory portions that were written to during the first iteration. Next, depending on the number of writes to the VM's memory that occur during the second iteration, a third iteration may be required, and so on. These iterative copying steps (indicated by the arrow labeled 270) may be expected to converge (that is, the amount of memory that has to be copied during a given iteration may in general tend to be smaller than the amount that was copied during a previous iteration) in most operating environments. In the depicted embodiment, the DMACDs may be requested or directed during at least a portion of the iterative pre-copy phase to store DMA write records for use by the VMCs as described above. At some point the combined size of the dirty memory portions to be copied during a step 270 may fall below a threshold (or may fall to zero), and the iterative pre-copy phase may be completed.

During the stop-and-copy phase 231, the running source VM 172 may be suspended in some embodiments and its network traffic may be redirected to the destination. CPU state, DMACD state and any remaining dirty memory portions may be copied to the destination. In at least some embodiments, a VMC may issue commands to the DMACDs of the source VH 160A to save representations of their respective configuration states for copying to the destination host during this phase. At the end of the stop-and-copy phase, in some implementations, a consistent suspended version of the VM may exist at both the source and the destination. The source VM may still be resumed at this stage if, for example, a failure occurs at the destination.

During the commitment phase 241, in some embodiments, the destination VH may inform the source VH that it is in a position to start up the migrated VM, and the source VM may be discarded. The source VM's state information may thus no longer be available from the source virtualization host after this point. The migrated VM may be started up on the destination VH during activation phase 251, with the DMACDs at the destination VH resuming operations where the source VH's DMACDs left off during the stop-and-copy phase.

The virtualization management service may typically attempt to minimize the duration of the stop-and-copy phase to keep the times for which applications are affected as low as possible. For example, VM suspension times of tens or at most a few hundred milliseconds may be targeted in some implementations. In some embodiments, the total time taken between the decision to perform the migration and the completion of the migration may also have to be minimized, e.g., in scenarios where an impending hardware failure or shutdown results in the decision to migrate. In at least some embodiments, parameters associated with generating and storing DMA write records may influence the time it takes for live migration—e.g., if the buffers designated for storing the DMA write records are too small, this could potentially lead to longer iterative pre-copy phases as DMA writes may get deferred.

DMA Write Record Components

Figure 3:
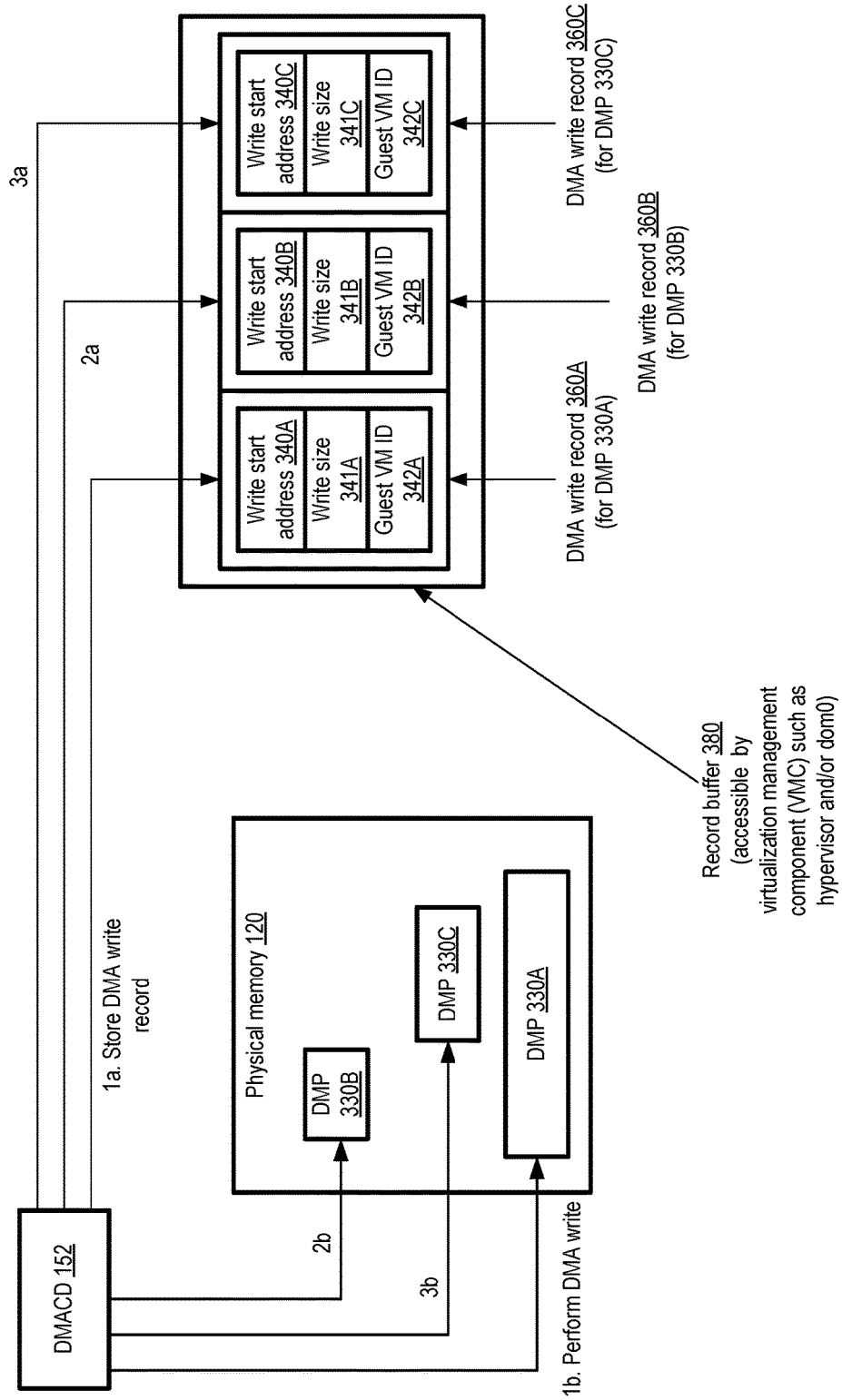
FIG. 3 illustrates example components of DMA write records that may be stored in a record buffer by a DMA-capable device, according to at least some embodiments.

FIG. 3 illustrates example components of DMA write records that may be stored in a record buffer by a DMA-capable device, according to at least some embodiments. In the depicted embodiment, a DMACD 152 has been configured to ensure that, prior to performing a given write to a portion of physical memory 120 of a virtualization host, a corresponding write record has been saved in a record buffer 380 that is accessible from a virtualization management component such as hypervisor and/or the dom0 operating system instance of the virtualization host. Three example DMA write operations are shown, together with the corresponding write records. As indicated by the labels "1a" and "1b" respectively, a DMA write record 360A is stored in buffer 380 prior to the write operation that results in DMP 330A. Similarly, DMA write record 360B is stored before the write to DMP 330B, and DMA write record 360C is stored before the write to DMP 330C.

At least in some embodiments, respective DMA write operations of a DMACD 152 may be of different sizes (i.e., a different number of bytes may be written in one operation than in another) and may be directed to different portions of physical memory allocated to different VMs. In order for the VMCs to be able to identify and copy the appropriate memory portions to save a particular VM's state, a given DMA write record 360 may therefore include at least an indication of a write start address 340 (e.g., start addresses 340A, 340B and 340C in records 360A, 360B and 360C respectively) and write sizes 341 (e.g., write sizes 341A, 341B and 341C). In the depicted embodiment, each write record may also include a VM identifier 342 (e.g., 342A, 342B or 342C) indicating the particular guest VM to which the memory being modified is assigned. In implementations in which the DMACD is a PCIe or PCI hardware device, the PCI requester ID may be used as a guest VM identifier. In other embodiments, different VM identifiers may be used. In some implementations, as described below, instead of storing the guest VM identifiers within the individual DMA records, separate record buffers 380 may be established for each guest VM.

In at least some, a DMACD 152 may be permitted to overwrite portions of memory that it wrote previously. Accordingly, when determining the order in which different portions of memory represented by different DMA write records should be copied to a destination virtualization host, a VMC may need to take the temporal ordering of the corresponding DMA writes into account. If the order in which the dirty memory portions is copied does not match the order in which the writes occurred, at least in some scenarios the incorrect version of a dirty memory portion may be saved as the final version at the destination. A number of different approaches may be taken to ensure that the memory copies are performed in the correct order in different embodiments. In some embodiments, for example, record buffers 380 may be organized as ordered circular buffers, queues or linked lists, so that the position of a particular DMA write record within the queue or list indicates the relative order in which the corresponding write operation was performed, relative to other DMA writes. In one implementation, sequence numbers, timestamps or other temporal ordering indicators may be included in the DMA write records 360.

Figure 4:
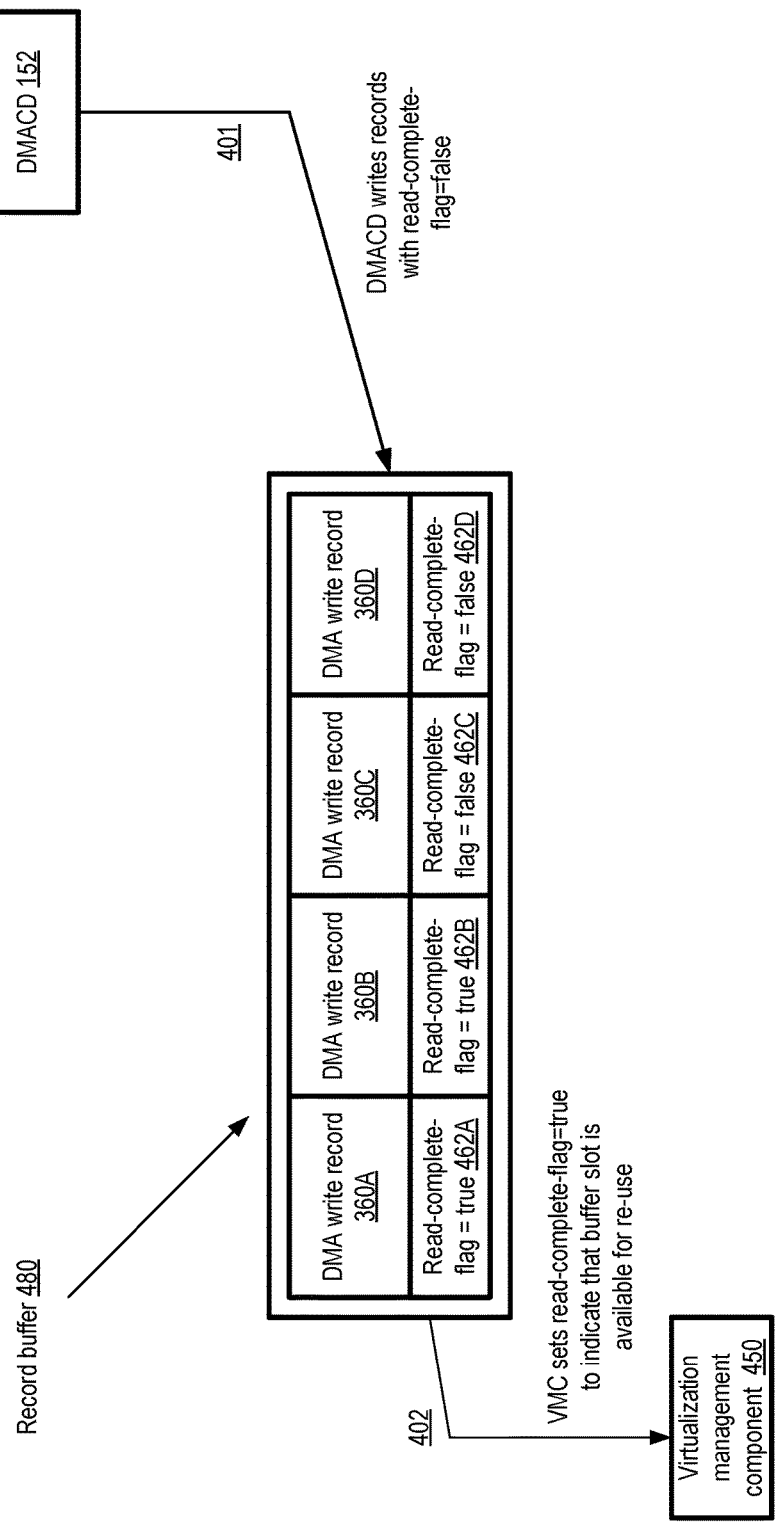
FIG. 4 illustrates an example technique that may be used by a VMC to indicate to the DMA-capable device that a slot within a record buffer has been examined and is available for re-use, according to at least some embodiments.

In various implementations, the maximum number of DMA write records 360 that can be stored within a write record buffer 380 may differ, based on the maximum amount of memory allocated for the buffer. As mentioned earlier, before writing a new DMA write record to a particular slot within the buffer, the DMACD may have to ensure that the VMC examining DMA write records has read the previous record that was stored in that slot. FIG. 4 illustrates an example technique that may be used by a VMC to indicate to the DMA-capable device that a slot within a record buffer has been examined and is available for re-use, according to at least some embodiments.

To simplify the presentation, only four record slots are shown in the buffer 380 of FIG. 4; in practice, at least in some embodiments, the record buffer may be able to hold far more DMA write records. In the depicted embodiment, each of the slots of the buffer 380 has an associated read-completed flag 460 (e.g., flags 462A, 462B, 462C and 462D corresponding to the slots that currently hold DMA write records 360A, 360B, 360C and 360D respectively). Each of the flags may store the logical values "true" or "false", indicating whether the slot's DMA write record 360 has been examined by the VMC 450 since it was last written by the DMACD 152. The read-completed flags may be implemented using a single bit for each slot in some implementations, e.g., with "0" representing "true" and "1" representing false.

When the record buffer 380 is initialized, the read-completed flags 462 of all the slots may be set to true, indicating to the DMACD that all the slots are available for storing DMA write records. The DMACD 152 may select a particular slot with the read-completed flag set to "true", store a write record 360 into that slot (as indicated by arrow 401), and set the flag to "false". The VMC 450 may examine a record 360 (as indicated by arrow 402) and set the flag to "true" after it has done so. If the DMACD 152 cannot find a slot that has the flag 462 set to "true", it may wait until such a slot becomes available. In some implementations in which the buffer 380 is implemented as a FIFO (first-in-first-out) data structure such as a circular buffer or a queue, the DMACD may maintain a write pointer or cursor indicating which slot was written to most recently, while the VMC may maintain a read pointer or cursor indicating which slot was read most recently. Such pointers/cursors may be used as the starting points of ordered searches for identifying which slot should be written to (by the DMACD) and read from (by the VMC), for example.

Instead of using flags 462, other techniques may be used by the DMACD and VMC to signal that writes or reads have completed in different embodiments. For example, in one embodiment, the VMC may simply zero out a slot after it has read the DMA write record that was stored in it, and the DMACD may search for a zeroed-out slot to store a new DMA write record.

Figure 5:
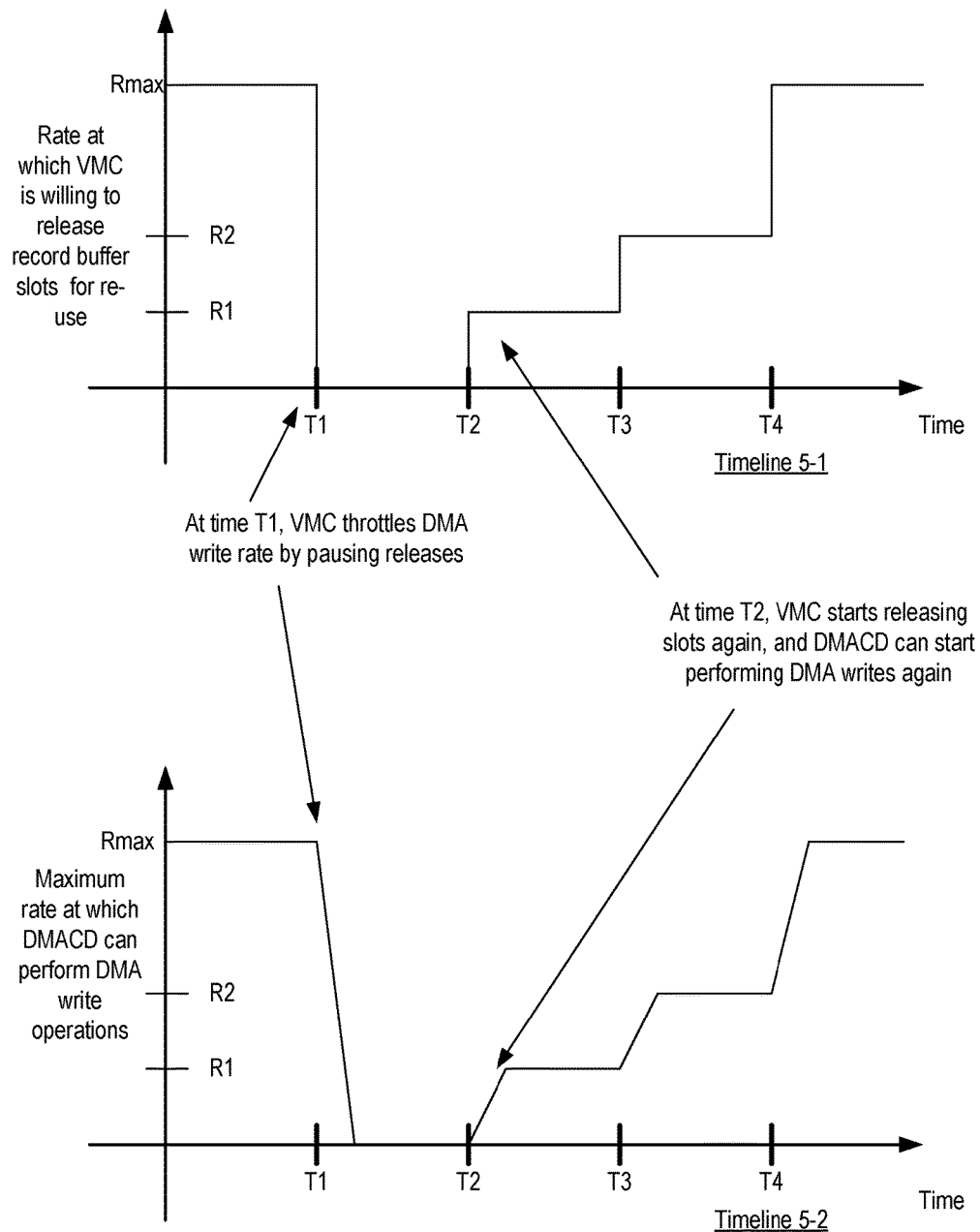
FIG. 5 illustrates example timelines showing how the maximum rate at which a DMA-capable device can modify physical memory may be controlled by a VMC by adjusting the rate at which the VMC releases record buffer slots for re-use, according to at least some embodiments.

The producer-consumer relationship between the DMACDs and the VMCs illustrated in FIG. 4 may allow a VMC to influence or limit the rate at which the DMACD can perform DMA writes. FIG. 5 illustrates example timelines showing how the maximum rate at which a DMA-capable device can modify physical memory may be controlled by a VMC by adjusting the rate at which the VMC releases record buffer slots for re-use, according to at least some embodiments. Timeline 5-1 shows the change in the rate at which a VMC is willing to release slots of a DMA record buffer 380 over time, while timeline 5-2 shows the maximum rate at which the DMACD configured to store DMA write records into that buffer can perform DMA writes. In both timelines, time increases from the left to the right.

Between some starting time T0 (e.g., a point of time during the iterative copy phase 221 of a live migration procedure such as that shown in FIG. 2) and a time T1, the VMC is willing to examine buffer contents and releases buffer slots at a maximum rate Rmax. The DMACD may therefore be able to write new DMA records at up to the same rate Rmax between T0 and T1, as shown in timeline 5-2. The DMACD may also perform DMA write operations at a rate up to Rmax. Rmax may, for example, be expressed in write records stored per second or buffers slots released per second, which may equal the DMA write operations per second, but may differ from the number of bytes written via DMA per second (since different DMA write operations may modify different amounts of memory). It is noted that the actual rate at which buffer slots are used up and released may be lower than the maximum possible rates shown in timelines 5-1 and 5-2.

At T1, the VMC may determine that it should throttle the DMA write rates by reducing the maximum rate at which it reads DMA write records and frees the corresponding buffer slots. In some embodiments, a triggering condition related to the rate of convergence of the iterative copy phase 221 may lead the VMC to reduce the rate at which it frees buffers. For example, the VMC may determine that the rate at which non-DMA writes have occurred during some time interval (e.g., T0 to T1) exceeds a threshold, and as a result the rate of DMA writes should be slowed down if possible. In an embodiment in which multiple DMACDs are used at the source virtualization host, a rapid rate of DMA writes from one DMACD may lead the VMC to slow down DMA writes from a different DMACD. Between T1 and T2, the maximum rate at which the VMC is willing to free buffer slots is zero. Accordingly, if the DMACD continues to write DMA records, the buffer may fill up at some time after T1, preventing any further DMA write operations until the VMC starts freeing up the buffer slots again.

In the example shown, the VMC starts freeing the slots at T2, and is willing to release slots at up to rate R1 in the interval between T2 and T3, at up to rate R2 between T3 and T4, and at Rmax thereafter. Accordingly, the maximum rate at which DMA write operations can be performed may also increase, reaching R1 at some point after the VMC increases the release rate to R1, reaching R2 at some point after the VMC increases the slot release rate to R2, and so on. It is noted that at least in some embodiments, the VMC may read the DMA write records faster than it releases the corresponding buffer slots (if, for example, the VMC decides to slow down the rate of DMA writes from a given DMACD to a rate lower than the maximum that the VMC can handle). For example, the set of dirty memory regions corresponding to DMA writes for a given copying iteration may be identified (and the corresponding memory regions may even be copied to the destination host) before the corresponding slots are released for re-use by the DMACD. That is, in at least some embodiments, the releasing of at least some buffer slots may be asynchronous with respect to the reading of the corresponding DMA write records by the VMC.

DMA Write Record Buffers

Figure 6A:
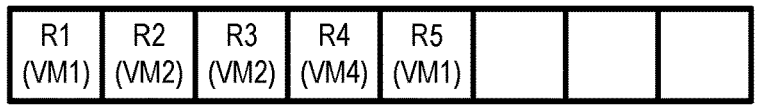
FIGS. 6a and 6b respectively illustrate consolidated record buffers and virtual-machine-specific record buffers, according to at least some embodiments.
Figure 6B:
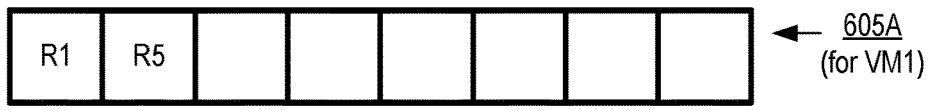
Figure 6B:
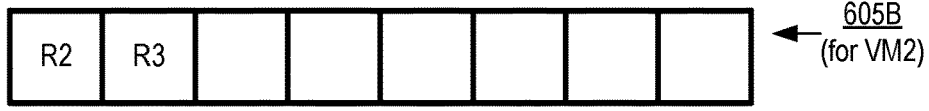
Figure 6B:
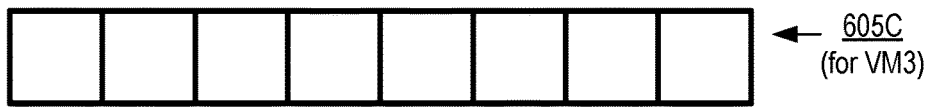
Figure 6B:
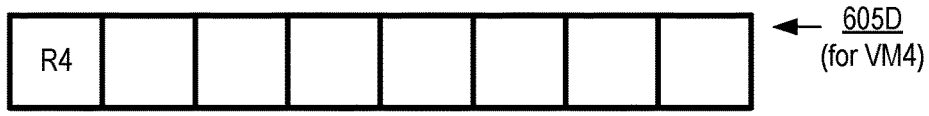
Figure 6B:
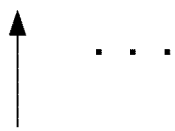

In some embodiments, as mentioned earlier, a single or consolidated record buffer may be used to store DMA write records for writes pertaining to several different VMs, while in other embodiments, respective buffers may be used for each VM. FIGS. 6a and 6b respectively illustrate consolidated record buffers and virtual-machine-specific record buffers, according to at least some embodiments. In FIG. 6a, DMA write records (e.g., R1, R2, R3, . . . ) indicative of DMA write operations directed to the memory assigned to several different VMs are all stored within the same consolidated buffer 601. In scenarios in which the state information of only a subset of the VMs running on a virtualization host is to be saved, the VMC may have to select the corresponding subset of the DMA write records from a consolidated buffer. In the example illustrated, if the state of VM2 is to be saved, the VMC may have to read all five data records in buffer 601, and add the dirty memory portions corresponding to records R2 and R3 to its list of memory segments to be copied, while ignoring the dirty memory portions corresponding to records R1 and R5 (for VM1) and R4 (for VM4).

In the approach illustrated in FIG. 6b, respective record buffers 605 may be allocated for each VM—e.g., buffer 605A for VM1, buffer 605B for VM2, buffer 605C for VM3, and buffer 605D for VM4. When the VMC has to save the state of a given VM, it may examine only the buffer corresponding to that specific VM. Less processing overhead may sometimes be incurred at the VMC if the approach illustrated in FIG. 6b is used instead of the approach illustrated in FIG. 6a. In contrast, depending on the amount of memory allocated for the respective buffers, more memory may be used in aggregate in the per-VM buffer approach than in the consolidated buffer approach. In scenarios in which all the VMs on a given source host have to be live migrated at about the same time (e.g., if a hardware failure is imminent or if a maintenance-window related shutdown is to be scheduled), the difference in processing overhead between the two approaches may be smaller.

Figure 7A:
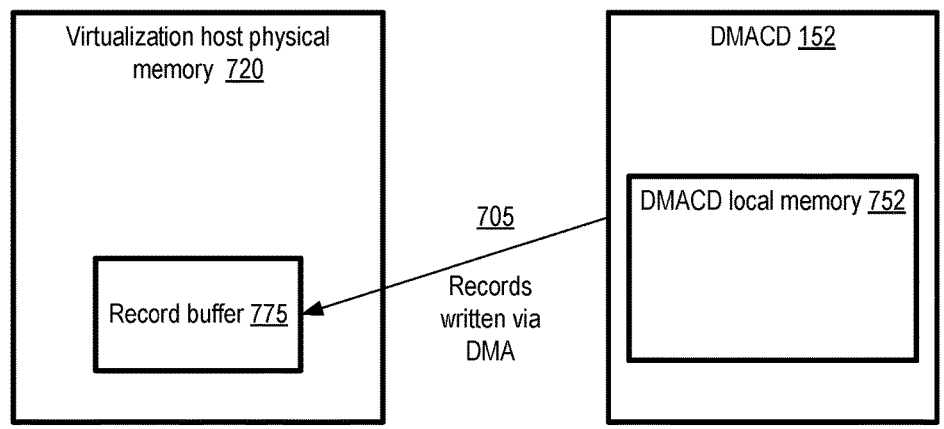
FIGS. 7a and 7b illustrate respective alternatives for locations at which record buffers may be implemented, according to at least some embodiments.
Figure 7B:
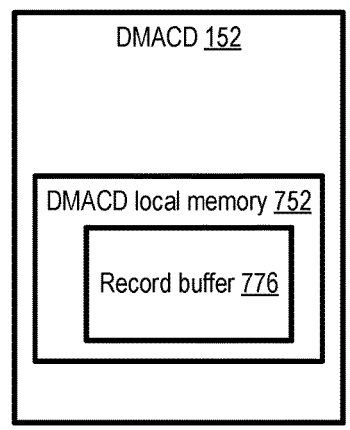

FIGS. 7a and 7b illustrate respective alternatives for locations at which record buffers may be implemented, according to at least some embodiments. In FIG. 7a, the record buffer 775 may be allocated from the virtualization host's physical memory. The DMA write records may initially be written within the DMACD 152's local memory 752 and then written (e.g., via DMA writes that do not require corresponding DMA write records to be stored) to the host's physical memory. In one embodiment, as described earlier, a structure such as a bitmap maintained by an I/O MMU (input/output memory management unit) in the virtualization host's memory may be used to indicate the portions of memory written to via DMA. In the latter scenario, while the virtualization host's physical memory may still be used for the I/O MMU's data structure, the overhead of additional DMA operations by the DMACD itself may be avoided. In a contrasting approach illustrated in FIG. 7b, a buffer 776 located in a portion of the DMACD's local memory that is readable by the VMC may be used. In the embodiment illustrated in FIG. 7b, no additional writes to the virtualization host's physical memory need be performed by the DMACD (or the I/O MMU) to store the DMA write records.

Methods for VM State Replication Using DMA Write Records

Figure 8:
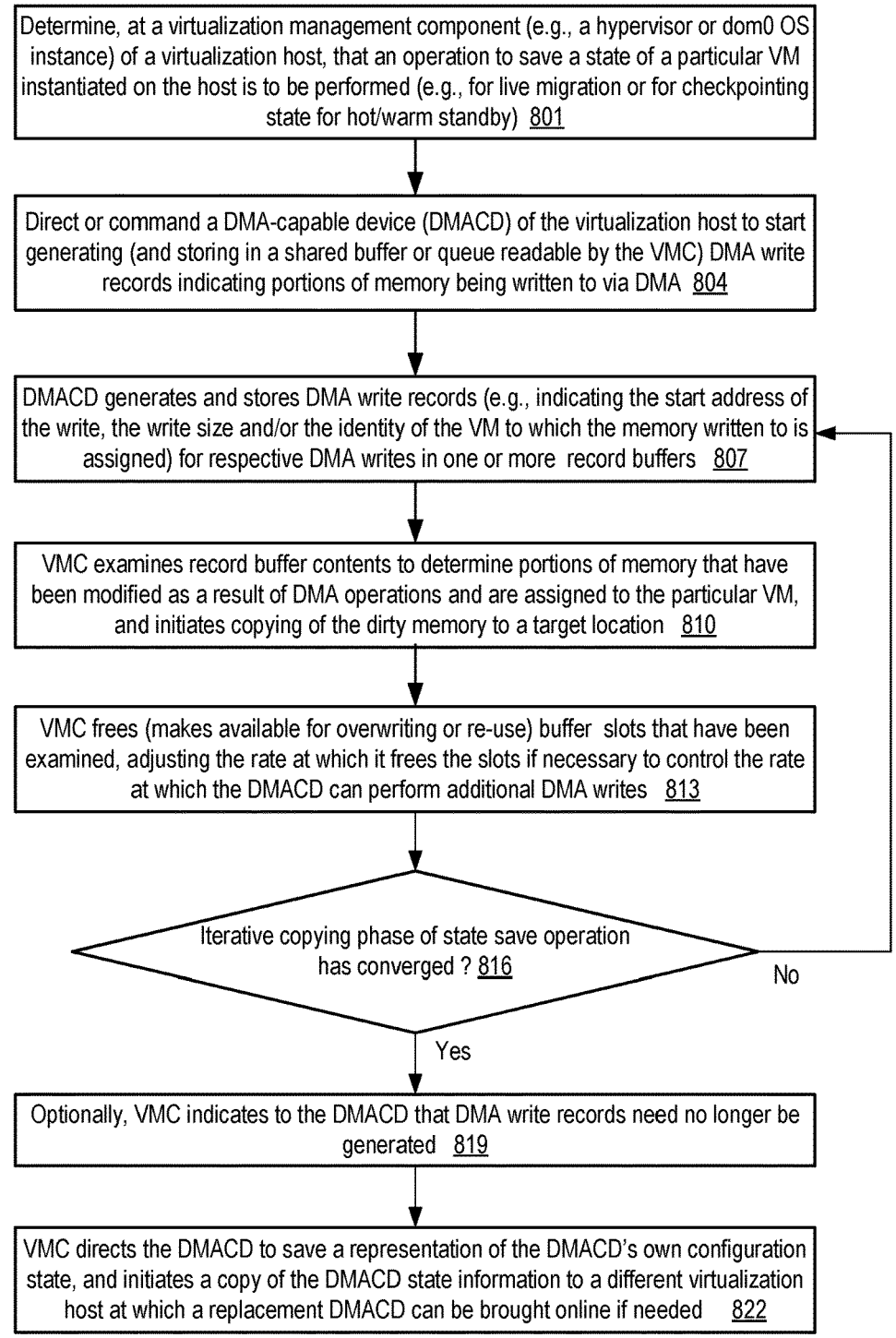
FIG. 8 is a flow diagram illustrating aspects of operations that may be performed to save virtual machine state information in environments in which DMA-capable devices may bypass virtualization management software when writing to physical memory of a virtualization host, according to at least some embodiments.

FIG. 8 is a flow diagram illustrating aspects of operations that may be performed to save virtual machine state information in environments in which DMA-capable devices may bypass virtualization management software when writing to physical memory of a virtualization host, according to at least some embodiments. As shown in element 801, a determination may be made at a virtualization management component (such as a hypervisor and/or a privileged/administrative instance of an operating system) of a source virtualization host that the state of a particular VM running at the host is to be saved. Such a determination may be made, for example, in response to an administrator request for a live migration, to save a checkpoint of the VM state to a hot or warm standby host or to a selected persistent storage device that may not necessarily be attached to a standby host at the time that the checkpoint is saved, in response to an alert generated at the source virtualization host (e.g., an alert that indicates an imminent hardware failure due to overheating), or in response to other triggering conditions in various embodiments. In at least one embodiment, the state of the VM may be saved in response to a hibernation request (a request to place the VM in a dormant state from which it can later be resumed, e.g., at a different host).

A DMACD of the source virtualization host (e.g., a PCIe-attached hardware card used for offloading network-ing-related processing or storage-related processing from the virtualization host's CPUs) may be directed by the VMC to start writing DMA write records corresponding to DMA write operations (element 804), e.g., during specific time windows or specific phases of a state-saving operation. Such records may make it possible for the VMC to quickly identify the portions of memory modified by the DMACD that have to be copied to save representations of the states of one or more VMs running at the host. In some embodiments, the record buffer or buffers to be used for the DMA write records may be allocated or identified during operations corresponding to element 804. In other embodiments, the record buffers may be pre-allocated, e.g., to avoid the overhead of having to allocate them during the state saving procedure. The command or request may be sent in some embodiments to the DMACD at or near the start of an iterative memory copying phase of a state save operation (e.g., the iterative copy phase 221 of the live migration procedure illustrated in FIG. 2 or an analogous phase of a state checkpoint operation). As mentioned earlier, the DMACDs may generate and store at least some DMA write records without being explicitly directed to do so by the VMCs in at least some embodiments.

Upon receiving the command or request, the DMACD may begin generating and storing DMA write records for various DMA write operation (element 807). A given DMA write record may identify the memory page(s) or block(s) being written to, e.g., by indicating the start address of the write and the size of the write. In one implementation, an identifier of the VM whose memory is being modified may be included in the write record. In other implementations, as indicated in FIG. 6b, separate buffers may be used for each VM's DMA writes, in which case the VM identifier may not be included in the write records. In some embodiments, the command or request issued by the VMC may include an identifier or identifiers of VMs whose state is to be saved, and the DMACD may be able to store DMA write records for only those write operations that modify the physical memory allocated to those specific VMs. Any of a number of different logical structures may be used for the DMA write record buffers in various embodiments, including for example FIFO queues, circular buffers, linked lists and the like.

The VMC may examine the content of the buffer or buffers to identify the portions of DMA-modified memory that are assigned to one or more VMs whose state is to be saved, and may initiate the copying of those portions of memory to a target such as a destination virtualization host's memory (element 810). In one embodiment, for example, a hypervisor may be responsible for reading the DMA write records stored by the DMACD, preparing a list of memory regions to be copied, and passing them on to a component of an administrative operating system instance (dom0) responsible for the actual copying.

The VMC may release the slots of the buffer after it examines them, thus making the slots re-usable by the DMACD (element 813), e.g., using a flag similar to the "read-complete" flag described earlier. The VMC that is responsible for freeing up space in the buffer(s) may defer the release of some number of slots for some periods of time to limit the rate at which the DMACD is able to perform DMA writes in some embodiments. Such rate-limiting operations may be performed by the VMC at various points in time in response to triggering conditions such as detecting that the rate at which non-DMA writes are occurring exceeds a threshold. In some embodiments, the operation to read a DMA write record may be asynchronous with respect to the operation to free the corresponding slot in the buffer—e.g., the VMC may read a DMA write record and wait for some time before freeing the slot.

After some targeted portion of the dirty memory has been copied (e.g., if the iterative copying phase has converged fully, or is estimated to be very near full convergence) (as detected in element 816), the VMC may in some embodiments optionally direct the DMACD to stop generating additional DMA write records. This may be done, for example, during or at the start of the stop-and-copy phase 231 of a live migration procedure shown in FIG. 2, or during an analogous phase of a state checkpoint procedure. The DMACD may be requested or commanded to save a representation of its own internal state (element 819) in a location from which the VMC can access it for copying to a target such as a destination virtualization host (element 822). If additional iterations of memory copying are needed (i.e., convergence has not been achieved for the iterative copying phase, as also detected in element 816), the operations corresponding to element 807, 810, 813 and 816 may be repeated until the copying procedure has converged to the desired extent in the depicted embodiment.

It is noted that in various embodiments, operations other than those illustrated in the flow diagram of FIG. 8 may be used to implement at least some of the techniques of using DMA write records to facilitate state saving operations for virtual machines. Some of the operations shown may not be implemented in some embodiments, may be implemented in a different order, or in parallel rather than sequentially.

Use Cases

The techniques described above, of storing DMA write records by DMA-capable devices to indicate portions of physical memory that have been modified as a result of DMA operations at a virtualization host may be useful in a variety of scenarios. As more and more applications are migrated to provider network environments, the need for efficient network-related processing and storage-related processing for virtual machines has increased, so that the overhead associate with using virtual machines instead of non-virtualized systems can be minimized. As a result, DMA-capable hardware devices, such as PCIe networking-offloading or storage-offloading cards designed to bypass the virtualization management software stack when interacting with physical memory of the host are becoming increasingly popular. It may be feasible in at least some embodiments to program (at a fairly low cost to a provider network operator) the firmware of DMA-capable devices of interest to generate and store, with minimal overhead during normal operating conditions, write records identifying the portions of physical memory that are modified via DMA. In other embodiments, application-specific integrated circuits (ASICs) that perform similar functions may be employed instead of or in addition to modifying the firmware on the DMA-capable devices. Given the increasing demands for live migration and VM state checkpointing, substantial returns on investment may be achieved by implementing one or more of DMA write recording schemes described.

Illustrative Computer System

Figure 9:
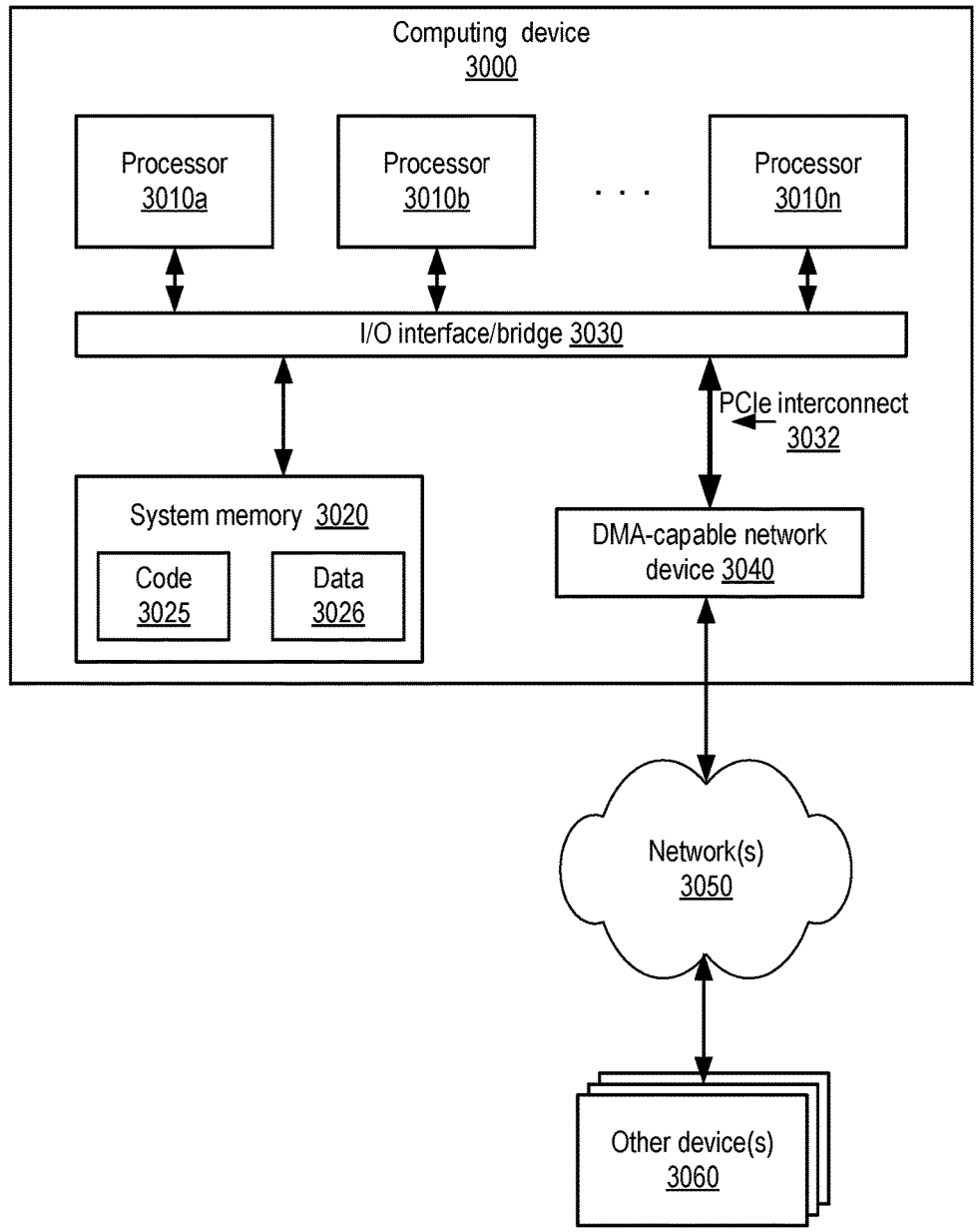
FIG. 9 is a block diagram illustrating an example computing device that may be used in at least some embodiments.

In at least some embodiments, a server that implements a portion or all of one or more of the technologies described herein, including the techniques to implement the various components of a virtualization host may include a general-purpose computer system that includes or is configured to access one or more computer-accessible media. FIG. 9 illustrates such a general-purpose computing device 3000. In the illustrated embodiment, computing device 3000 includes one or more processors 3010 coupled to a system memory 3020 (which may comprise both non-volatile and volatile memory modules) via an input/output (I/O) interface 3030. Computing device 3000 further includes a network interface 3040 coupled to I/O interface 3030 (which may also be referred to as a bridge).

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA. In some implementations, graphics processing units (GPUs) may be used instead of, or in addition to, conventional processors. In at least some embodiments, the GPUs may perform DMA writes and store DMA write records as described above.

System memory 3020 may be configured to store instructions and data accessible by processor(s) 3010. The data may include portions of memory written to via DMA operations. In at least some embodiments, the system memory 3020 may comprise both volatile and non-volatile portions; in other embodiments, only volatile memory may be used. In various embodiments, the volatile portion of system memory 3020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 3020 as code 3025 and data 3026.

In one embodiment, I/O interface/bridge 3030 may be configured to coordinate I/O traffic between processor 3010, system memory 3020, and any peripheral devices of the computing device, including various DMA-capable hardware devices such as a DMA-capable network device 3040, a DMA-capable storage device (not shown) or other peripheral interfaces. One or more DMA-capable devices may be attached via a PCIe interconnect 3032 (or some other peripheral interconnect) in different embodiments. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral interconnects, such as the PCIe interconnect 3032, or a bus complying with the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network device 3040 may be configured to allow data to be exchanged between computing device 3000 and other devices 3060 attached to a network or networks 3050, such as other computer systems or devices as illustrated in FIG. 1 through FIG. 8, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol. Non-DMA capable network devices may be employed in addition to the DMA-capable network device 3040 at computing device 3000.

In some embodiments, system memory 3020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via a network device 3040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A DMA-capable hardware device configured to:
   determine that a particular DMA write operation directed to a portion of memory device assigned to a virtual machine instantiated at a virtualization host is to be scheduled;
   store, in a particular slot of a record buffer accessible from a virtualization management component of the virtualization host, a first DMA write record indicating the portion of memory to which the particular DMA write operation is directed; and,
   subsequent to a determination that the virtualization management component has examined the particular slot, store a different DMA write record indicative of a different DMA write operation in the particular slot.

2. The DMA-capable hardware device as recited in claim 1, wherein the DMA-capable hardware device is attached to a communication bus of the virtualization host.

3. The DMA-capable hardware devices as recited in claim 1, wherein the DMA-capable hardware device is attached to a particular interconnect of the virtualization host, wherein the particular interconnect is compliant with a version of the PCI (Peripheral Component Interconnect) or PCIe (Peripheral Component Interconnect Express) standard.

4. The DMA-capable hardware device as recited in claim 1, wherein the DMA-capable hardware device is configured to:
offload a networking-related I/O processing operation from one or more processors of the virtualization host.

5. The DMA-capable hardware device as recited in claim 1, wherein the DMA-capable hardware device is configured to:
offload a storage-related I/O processing operation from one or more processors of the virtualization host.

6. The DMA-capable hardware device as recited in claim 1, wherein the DMA-capable hardware device comprises a graphical processing unit (GPU).

7. The DMA-capable hardware device as recited in claim 1, wherein the DMA-capable hardware device is compliant with a Single Root I/O Virtualization (SR-IOV) specification of the PCI Special Interest Group (PCI SIG).

8. A method, comprising:
performing, by a DMA-capable hardware device communicatively coupled to a memory:
determining that a particular DMA write operation directed to a portion of the memory assigned to a virtual machine instantiated at a virtualization host is to be performed by the DMA-capable hardware device;
generating a first DMA write record indicating the portion of memory to which the particular DMA write operation is directed; and
storing, in a particular slot of a record buffer accessible from a virtualization management component of the virtualization host, the first DMA write record.

9. The method as recited in claim 8, further comprising performing, by the DMA-capable hardware device:
subsequent to determining that the virtualization management component has examined the particular slot, storing a different DMA write record indicative of a different DMA write operation in the particular slot.

10. The method as recited in claim 9, wherein said determining that the virtualization management component has examined the particular slot comprises analyzing a read-completed flag updated by the virtualization management component.

11. The method as recited in claim 8, further comprising performing, by the DMA-capable hardware device:
receiving, prior to said storing, a command from the virtualization management component indicating that the first DMA write record is to be generated.

12. The method as recited in claim 11, wherein the virtualization management component comprises one or more of: (a) a hypervisor or (b) an administrative instance of an operating system.

13. The method as recited in claim 8, wherein the record buffer is incorporated within a physical memory of the virtualization host.

14. The method as recited in claim 8, wherein the record buffer is incorporated within a local memory of the DMA-capable device.

15. The method as recited in claim 8, further comprising performing, by the DMA-capable hardware device:
receiving, after storing the first DMA write record in the particular slot, an indication that respective DMA write records associated one or more additional DMA write operations are not to be generated; and
initiating an additional DMA write operation without generating a corresponding DMA write record.

16. The method as recited in claim 8, wherein the record buffer comprises one or more slots including the particular slot, further comprising performing, by the DMA-capable hardware device:
determining, after storing the first DMA write record in the particular slot, that none of the slots of the one or more slots of the record buffer is available for storing another DMA write record corresponding to an additional DMA write operation; and
deferring the additional DMA write operation.

17. A non-transitory computer-accessible storage medium storing program instructions that when executed at a DMA-capable hardware:
determine that a particular DMA write operation directed to a portion of memory device communicatively coupled to the DMA-capable hardware device and assigned to a virtual machine instantiated at a virtualization host is to be performed by the DMA-capable hardware device;
generate a first DMA write record indicating the portion of memory to which the particular DMA write operation is directed; and
store, in a particular slot of a record buffer accessible from a virtualization management component of the virtualization host, the first DMA write record.

18. The non-transitory computer-accessible storage medium as recited in claim 17, wherein the program instructions when executed at the DMA-capable hardware device:
subsequent to determining that the virtualization management component has examined the particular slot, store a different DMA write record indicative of a different DMA write operation in the particular slot.

19. The non-transitory computer-accessible storage medium as recited in claim 17, wherein the program instructions when executed at a DMA-capable hardware device:
determine, based at least in part on a command generated by the virtualization management component, that the first DMA write record is to be generated.

20. The non-transitory computer-accessible storage medium as recited in claim 17, wherein the program instructions when executed at a DMA-capable hardware device:
determine, after storing the first DMA write record in the particular slot, that the record buffer does not comprise a free slot for a DMA write record corresponding to an additional DMA write operation; and
defer the additional DMA write operation.

* * * * *